United States Patent [19]

DeToia

[11] 4,050,652

[45] Sept. 27, 1977

[54] GYRO FOIL

[75] Inventor: Vincent D. DeToia, Bronx, N.Y.

[73] Assignee: The Raymond Lee Organization, Inc., New York, N.Y. ; a part interest

[21] Appl. No.: 708,345

[22] Filed: July 26, 1976

[51] Int. Cl.² ............................................. B64C 29/00
[52] U.S. Cl. .................................. 244/23 C; 244/12.2
[58] Field of Search ...................... 244/12.2, 23 C, 39, 244/73 C, 73 B, 23 B

[56] References Cited

U.S. PATENT DOCUMENTS

| | | | |
|---|---|---|---|
| 2,736,514 | 2/1956 | Ross | 244/23 C |
| 3,002,709 | 10/1961 | Cochran | 244/12.2 |
| 3,395,876 | 8/1968 | Green | 244/23 C |
| 3,774,865 | 11/1973 | Pinto | 244/23 C |

FOREIGN PATENT DOCUMENTS

| | | | |
|---|---|---|---|
| 678,700 | 1/1964 | Canada | 244/23 C |
| 583,318 | 10/1958 | Italy | 244/12.2 |
| 648,346 | 10/1962 | Italy | 244/23 C |

Primary Examiner—Trygve M. Blix
Assistant Examiner—Charles E. Frankfort
Attorney, Agent, or Firm—Howard I. Podell

[57] ABSTRACT

A flying vehicle in the form of a fixed structure fitted with propulsion engines and in the form of a fixed wing and tail section mounted to a pair of counter-rotatable discs, one below and one above the fixed structure, with the discs when rotating providing both aerodynamic lift and gyroscopic stability.

1 Claim, 4 Drawing Figures

GYRO FOIL

SUMMARY OF THE INVENTION

My invention is a flying vehicle in the form of a fixed structure fitted with propulsion engines and in the form of a fixed wing and tail section mounted to a pair of counter-rotatable discs, one below and one above the fixed structure, with the discs when rotating providing both aerodynamic lift and gyroscopic stability.

BRIEF DESCRIPTION OF THE DRAWINGS:

The objects and features of the invention may be understood with reference to the following detailed description of an illustrative embodiment of the invention, taken together with the accompanying drawings in which.

Figure 1:
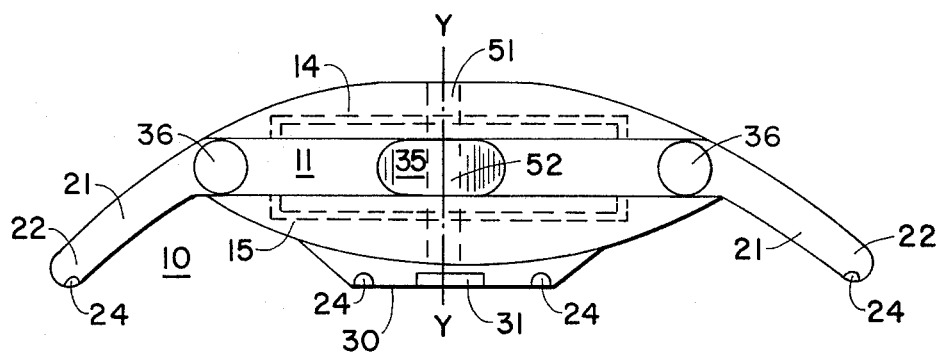
FIG. 1 is a front end view of the invention.
Figure 2:
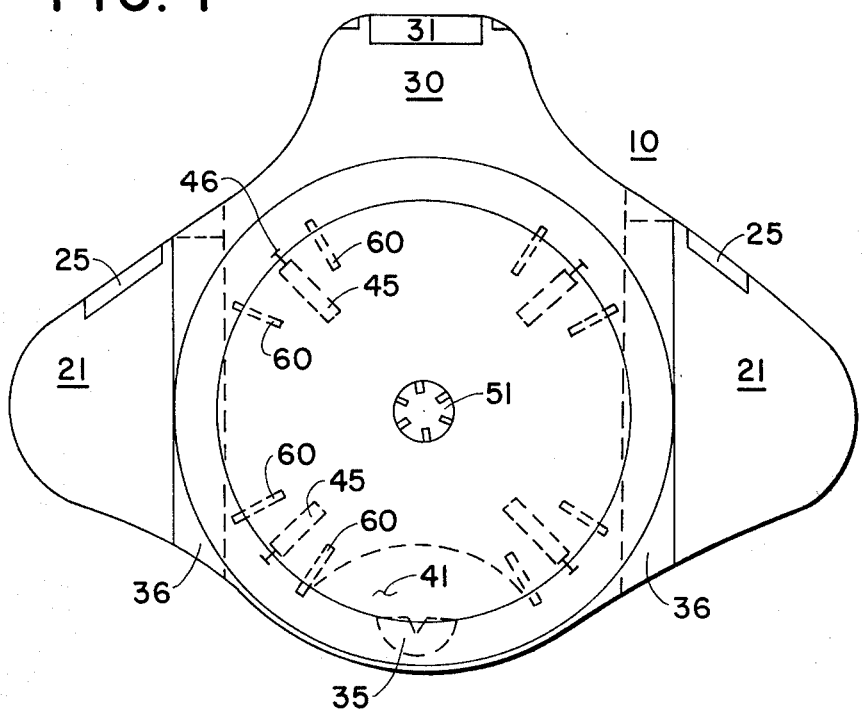
FIG. 2 is a plan view of the invention.
Figure 3:
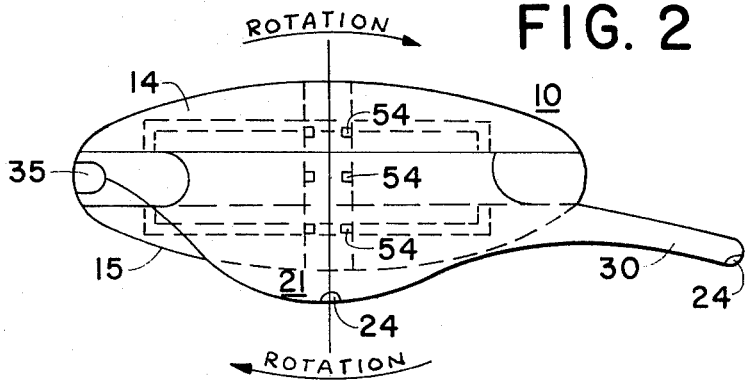
FIG. 3 is a side view of the invention.
Figure 4:
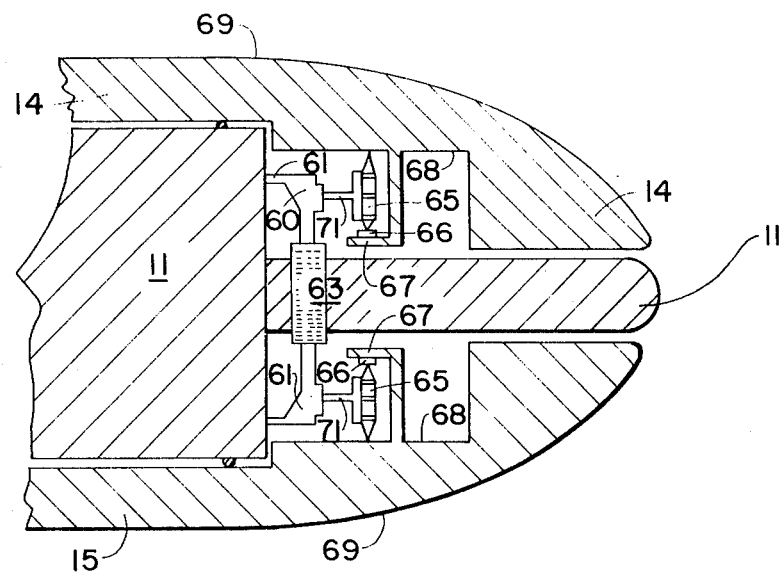
FIG. 4 is a detail elevation view of the disc holding bracket assembly and brake shoe.

DESCRIPTION OF THE PREFERRED EMBODIMENT:

Turning now descriptively to the drawings, in which similar reference characters denote similar elements throughout the several views, FIGS. 1-3 illustrate the air vehicle 10 which is formed of a fixed structure section 11, above and below which are mounted each of a pair of discs 14 and 15 to rotate in opposite direction about the vertical axis Y—Y of the vehicle to provide aerodynamic lift and gyroscopic stability.

Fixed structural section 11 is formed with a pair of wing sections 21 each extending to a side of the vehicle 10 and downwards, with the end tip 22 of each wing section 21 fitted with a retractable landing gear assembly 24. An aileron 25 is mounted in the trailing edge 26 of each wing section.

A tail section 30 extends from the rear of the fixed section 11 and is fitted with an elevator panel 31 on its trailing edge, with tail section 30 extending downwards and fitted at opposed lateral sides with retractable landing gear assemblies 24.

A pilot's cabin 41 fitted with a transparent windshield 35 is mounted in the forward central section of the fixed section 11.

A jet engine assembly 36 is internally mounted in the fixed structure adjacent to each wing section 21 to provide forward propulsion to the vehicle.

An upper disc 14 and a lower disc 15 are rotatably mounted above and below the fixed structure 11 with each disc rotatably latched by a plurality of bracket assemblies 60 to the fixed structure 11 adjacent at the periphery of each disc 14 and 15 with each disc 14 and 15 internally fitted with a plurality of drive engines 45 each joined to a drive wheel 46 that rotates against the fixed structure 11 to rotate each disc 14 and 15.

Each disc 14 and 15 is formed with a through concentric opening 51 joined to a through concentric opening 52 in the fixed structure, with the walls of openings 51 and 52 fitted with turbine blades 54 for generating an upward thrust through openings 51 and 52 when the discs are rotating in opposite directions. Alternately a vertical jet engine may be mounted in concentric opening 52 of the fixed structure 11.

Each disc 14 and 15 is held to the fixed structure 11 by a pluarlity of holding brackets 60.

Holding bracket 60 is formed of a pair of support members 61 each joined to the fixed structure 11 and joined to each other by a hydraulic cylinder 63 or spring means to apply a tension to draw support members 60 together, with each support member 61 fitted with a rotatable gear 65 that bears on a ring track 66 mounted on a flange 67 attached to the internal face 68 of the discs 14 or 15 so as to furnish a rotatable clamp to the disc to join it to the support structure. Gears 65 of each disc 14 and 15 may be fitted about their shafts 71 with a brake so as to vary the rotational speed of a disc 14 or 15 to produce yaw.

The exterior face 69 of each disc may be shaped to provide aerodynamic characteristics, as desired to each disc when rotated.

Since obvious chances may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An air vehicle formed of a fixed structure to which one of a pair of solid rotatable convex discs is rotatably mounted externally above, and the other of a pair of said discs rotatably mounted externally below said fixed structure about a common vertical axis for providing stability and lift to said structure, together with means to rotate each disc with respect to the said structure in counter-rotating directions relative to each other, in which the fixed structure is fitted with wings and a tail section that extend beyond the discs, and in which
each disc is formed with a through concentric opening joining a through concentric opening in the fixed structure through said vertical axis, with the internal walls of said openings in the discs and fixed structure fitted with turbine blades to generate lift when the discs are rotated, and with
the external surface of each disc shaped to provide aerodynamic lift characteristics when rotated.

* * * * *